US012792849B2

(12) United States Patent
Dong et al.

(10) Patent No.: US 12,792,849 B2
(45) Date of Patent: Nov. 10, 2026

(54) METHOD FOR GENERATING SPEECH TRANSLATION MODEL, TRANSLATION METHOD, AND APPARATUS

(71) Applicants: Beijing Youzhuju Network Technology Co., Ltd., Beijing (CN); Beijing Zitiao Network Technology Co., Ltd., Beijing (CN)

(72) Inventors: Qianqian Dong, Beijing (CN); Zhiying Huang, Beijing (CN); Yu Ting Ko, Hong Kong (HK); Qiao Tian, Beijing (CN)

(73) Assignees: Beijing Youzhuju Network Technology Co., Ltd., Beijing (CN); Beijing Zitiao Network Technology Co., Ltd, Beijing (CN)

( * ) Notice: Subject to any disclaimer, the term of this patent is extended or adjusted under 35 U.S.C. 154(b) by 189 days.

(21) Appl. No.: 18/734,831

(22) Filed: Jun. 5, 2024

(65) Prior Publication Data

US 2024/0403573 A1 Dec. 5, 2024

(30) Foreign Application Priority Data

Jun. 5, 2023 (CN) ........................ 202310659465.7

(51) Int. Cl.
*G06F 40/58* (2020.01)
*G10L 15/00* (2013.01)
*G10L 15/18* (2013.01)

(52) U.S. Cl.
CPC ........... *G06F 40/58* (2020.01); *G10L 15/005* (2013.01); *G10L 15/1815* (2013.01)

(58) Field of Classification Search
CPC .......... G06F 40/40; G06F 40/30; G06F 40/58; G06F 40/44; G06F 40/20; G06F 40/47; G06F 40/205; G06F 40/242; G06F 40/279; G06F 40/45; G06F 40/35; G06F 40/56; G06F 16/243; G06F 16/322; G06F 16/3329; G06F 16/2244; G10L 15/063; G10L 15/16; G10L 15/1815; G10L 15/26; G10L 15/02;
(Continued)

(56) References Cited

U.S. PATENT DOCUMENTS 10,224,023 B2 * 3/2019 Chien .................. G10L 15/063
11,763,096 B2 * 9/2023 Tunstall-Pedoe ... G06F 16/3329 704/9

(Continued)

*Primary Examiner* — Vijay B Chawan
(74) *Attorney, Agent, or Firm* — Alleman Hall LLP

(57) ABSTRACT

Embodiments of the disclosure relate to a method and apparatus for generating a speech translation model, an electronic device, and a medium. The method includes extracting, by a semantic feature extractor, a source semantic unit sequence of source language audio and a target semantic unit sequence of target language audio, wherein the source language audio corresponds to the target language audio. The method further includes adjusting a first decoder from a plurality of decoders based on the source semantic unit sequence and the target semantic unit sequence. The method further includes adjusting a second decoder of the plurality of decoders based on the source semantic unit sequence, the target semantic unit sequence, a source acoustic unit sequence of the source language audio, and a target acoustic unit sequence of the target language audio.

20 Claims, 11 Drawing Sheets

(58) Field of Classification Search
CPC ..... G10L 15/183; G10L 15/22; G10L 15/005; G10L 15/04; G06N 3/0442; G06N 3/0455; G06N 3/08
USPC .............................................................. 704/2
See application file for complete search history.

(56) References Cited

U.S. PATENT DOCUMENTS

| | | | | |
|---|---|---|---|---|
| 11,829,725 | B2 * | 11/2023 | Tunstall-Pedoe | G06F 16/3329 |
| 11,989,507 | B2 * | 5/2024 | Tunstall-Pedoe | G06F 16/3344 |
| 12,456,008 | B2 * | 10/2025 | Tunstall-Pedoe | G06F 40/56 |
| 12,518,107 | B2 * | 1/2026 | Tunstall-Pedoe | G06F 40/35 |
| 2008/0208563 | A1 * | 8/2008 | Sumita | G06F 40/40 704/E15.045 |
| 2018/0166069 | A1 * | 6/2018 | Chien | G10L 15/063 |
| 2024/0028841 | A1 * | 1/2024 | Li | G10L 15/16 |
| 2024/0289563 | A1 * | 8/2024 | Ramanovich | G10L 25/18 |
| 2024/0403573 | A1 * | 12/2024 | Dong | G10L 15/005 |
| 2025/0061888 | A1 * | 2/2025 | Dong | G10L 15/063 |
| 2025/0156656 | A1 * | 5/2025 | Huang | G06F 40/58 |
| 2025/0156657 | A1 * | 5/2025 | Huang | G06F 40/58 |

* cited by examiner

METHOD FOR GENERATING SPEECH TRANSLATION MODEL, TRANSLATION METHOD, AND APPARATUS

CROSS-REFERENCE TO RELATED APPLICATION(S)

This application claims priority to Chinese Application No. 202310659465.7 filed Jun. 5, 2023, the disclosure of which is incorporated herein by reference in its entity.

FIELD

Embodiments of the disclosure relate to the field of computers, and more specifically, relates to a method and apparatus for generating a speech translation model, an electronic device, and a medium.

BACKGROUND

Speech-to-speech translation (S2ST) refers to a type of technology that converts speech in one language into speech in another language, which is also known as speech translation, and is very helpful in breaking down communication barriers between people who do not speak the same language. Unlike conventional text-to-text machine translation, both the input and output of the speech translation task are speech. The technology is becoming increasingly important in the trend of globalization, providing more direct convenience especially in cross-border communication, tourism, business, and other fields.

A typical speech translation model is typically composed of three tasks: automatic speech recognition (ASR), machine translation (MT), and text to speech (TTS). An encoder-decoder structure is often used for sequence-to-sequence learning, and this approach can be used for learning a direct end-to-end speech translation model. In the end-to-end speech translation model, there may be two research routes based on a prediction form of a target end, including a continuous speech spectrum and discrete speech units.

SUMMARY

Embodiments of the disclosure provide a method and apparatus for generating a speech translation model, an electronic device, and a computer-readable storage medium.

According to a first aspect of the disclosure, a method for generating a speech translation model is provided, and the speech translation model includes a semantic feature extractor and a plurality of decoders. The method includes extracting, by a semantic feature extractor, a source semantic unit sequence of source language audio and a target semantic unit sequence of target language audio, and the source language audio corresponds to the target language audio. The method further includes adjusting a first decoder of the plurality of decoders based on the source semantic unit sequence and the target semantic unit sequence. The method further includes adjusting a second decoder of the plurality of decoders based on the source semantic unit sequence, the target semantic unit sequence, a source acoustic unit sequence of the source language audio, and a target acoustic unit sequence of the target language audio, where the semantic feature extractor remains unchanged during the adjustment of the first decoder and the second decoder.

According to a second aspect of the disclosure, a method for speech translation is provided. The method is performed by the speech translation model generated according to the first aspect, where the speech translation model includes a semantic feature extractor and a plurality of decoders. The method includes generating a predicted target semantic unit sequence based on a given source semantic unit sequence of given source language audio. The method further includes generating a predicted acoustic unit sequence based on the given source semantic unit sequence of the given source language audio, the predicted target semantic unit sequence, and a given source acoustic unit sequence.

According to a third aspect of the disclosure, an apparatus for generating a speech translation model is provided. The speech translation model includes a semantic feature extractor and a plurality of decoders. The apparatus includes a semantic feature extraction module, configured to extract a source semantic unit sequence of source language audio and a target semantic unit sequence of target language audio, where the source language audio corresponds to the target language audio. The apparatus further includes a first decoding adjustment module, configured to adjust a first decoder of the plurality of decoders based on the source semantic unit sequence and the target semantic unit sequence. The apparatus further includes a second decoding adjustment module, configured to adjust a second decoder of the plurality of decoders based on the source semantic unit sequence, the target semantic unit sequence, a source acoustic unit sequence of the source language audio, and a target acoustic unit sequence of the target language audio, where the semantic feature extractor remains unchanged during the adjustment of the first decoder and the second decoder.

According to a fourth aspect of the disclosure, an apparatus for speech translation is provided. The apparatus is configured to use the speech translation model generated according to the third aspect. The apparatus includes a first predicted semantic determination module, configured to generate a predicted target semantic unit sequence based on a given source semantic unit sequence of given source language audio. The apparatus further includes a first predicted acoustic determination module, configured to generate a predicted acoustic unit sequence based on the given source semantic unit sequence of the given source language audio, the predicted target semantic unit sequence, and a given source acoustic unit sequence.

According to a fifth aspect of the disclosure, an electronic device is provided. The electronic device includes a processor and a memory coupled with the processor. The memory has instructions stored therein, and the instructions, when executed by the processor, enable the electronic device to perform the method according to the first aspect.

According to a sixth aspect of the disclosure, a computer-readable storage medium is provided. The computer-readable storage medium stores one or more computer instructions, where the one or more computer instructions are performed by a processor to implement the method according to the first aspect.

The summary of the invention is provided to introduce concept selection in a simplified form, which will be further described in the following specific implementations. The summary of the invention is not intended to identify key or essential features of the subject claimed for protection, nor is it intended to limit the scope of the subject claimed for protection.

BRIEF DESCRIPTION OF THE DRAWINGS

The above and other features, advantages, and aspects of various embodiments of the disclosure will become more apparent in conjunction with the accompanying drawings and with reference to following detailed descriptions. In the accompanying drawings, same or similar reference numerals denote same or similar elements.

In all the accompanying drawings, the same or similar reference numerals denote the same or similar elements.

DETAILED DESCRIPTION OF EMBODIMENTS

Figure 1:
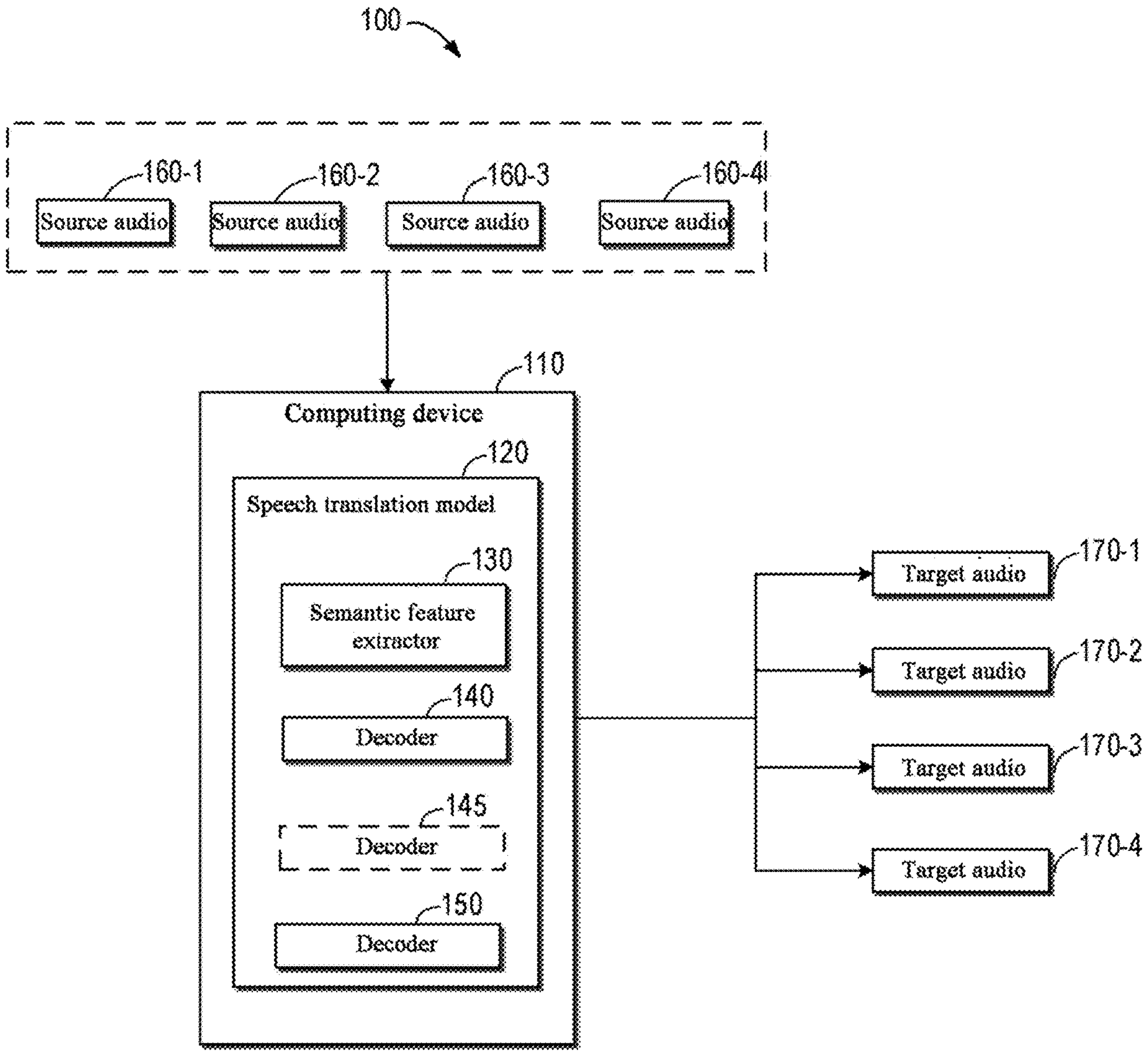
FIG. 1 illustrates a schematic diagram of an example environment where a method for speech translation according to some embodiments of the disclosure may be implemented.

It should be understood that before using the technical solutions disclosed in various embodiments of the disclosure, users should be properly informed of the types, application ranges, usage scenarios, etc. of personal information (e.g., speech) involved in the disclosure in accordance with relevant laws and regulations, and then authorizations of the users are obtained.

For example, in response to receiving an active request of the user, a prompt message is sent to the user to clearly indicate the user that it is necessary to obtain and use the personal information of the user for the operation requested to be performed. Therefore, the user may freely select, according to the prompt message, whether to provide the personal information (e.g., speech) for software or hardware, such as an electronic device, an application, a server, or a storage medium performing the operations of the technical solutions of the disclosure. It should be understood that the above notification and user authorization obtaining process is only illustrative, which does not limit the implementations of the disclosure, and other methods that comply with relevant laws and regulations may also be applied to the implementations of the disclosure.

It should be understood that data (including but not limited to the data itself, and data acquisition, or usage) involved in the technical solutions should comply with the requirements of corresponding laws and regulations, and relevant stipulations.

The embodiments of the disclosure will be described in more detail below with reference to the accompanying drawings. Although the accompanying drawings show some embodiments of the disclosure, it should be understood that the disclosure may be implemented in various forms, and should not be construed as being limited to the embodiments stated herein. On the contrary, these embodiments are provided for a more thorough and complete understanding of the disclosure. It should be understood that the accompanying drawings and the embodiments of the disclosure are for exemplary purposes only, and are not intended to limit the scope of protection of the disclosure.

In the description of the embodiments of the disclosure, the term “include” and similar terms thereof should be understood as open-ended inclusions, that is, “including but not limited to”. The term “based on” should be understood as “at least partially based on.” The term “an embodiment” or “this embodiment” should be understood as “at least one embodiment”. The terms “first”, “second”, etc. may refer to different or identical objects, unless otherwise explicitly specified. Additional explicit and implicit definitions may be included below.

A typical speech translation model is typically composed of three tasks: speech recognition, machine translation, and text to speech. However, dividing the task into three cascaded sub-tasks leads to the accumulation of errors from the previous sub-task to the subsequent sub-tasks, affecting the final effect of the speech translation task.

An encoder-decoder model architecture is often used for sequence-to-sequence learning, and this approach may also be used for learning a direct end-to-end speech translation model, thereby avoiding the error accumulation of a cascaded scheme. However, the simultaneous use of the encoder-decoder architecture results in a huge number of model parameters, low training efficiency, and high engineering implementation requirements.

To solve the above problems, an embodiment of the disclosure provides a speech translation scheme that trains a decoder-only model architecture. The scheme may allow for only training a plurality of decoders during training the speech translation model, thereby reducing the number of parameters in the training process, improving the training efficiency, meanwhile, lowering the engineering implementation requirements, and achieving a better speech translation effect. The scheme utilizes one decoder to convert semantic units of source audio. Due to avoiding the conversion from the audio into a text, the decoder can not only process an ordinary written language but also can process an unwritten language (e.g., a dialect and a minority language). Meanwhile, another decoder is utilized for synthesizing the audio from the semantic units, incorporating acoustic units from the source audio during processing, thereby learning source audio characteristics, speech patterns, etc.

FIG. 1 illustrates a schematic diagram of an example environment 100 where a method for speech translation according to some embodiments of the disclosure may be implemented. As shown in FIG. 1, the example environment 100 may include a computing device 110, which may be a user terminal, a mobile device, a computer, etc., and may also be a computing system, a single server, a distributed server, or a cloud-based server. The computing device 110 may receive source audio 160-1, source audio 160-2, source audio 160-3, and source audio 160-4 (individually or collectively referred to as source audio 160). The source audio 160 may be understood as a segment of speech, such as a user speech, which includes a meaningful content that can usually be recorded in text. It should be understood that the environment 100 may further include more or less audio.

In the computing device 110, a speech translation model 120 may also be included. For example, the speech translation model 120 is deployed in the computing device 110. The speech translation model 120 may be configured to generate, based on the audio 160, translation results of the audio 160, namely target audio 170-1, target audio 170-2, target audio 170-3, and target audio 170-4 (individually or collectively referred to as target audio 170). Each source audio in the source audio 160 corresponds to the corresponding target audio in the target audio 170. For example, the speech translation model 120 may translate the source audio 160-1 into the target audio 170-1, and translate the source audio 160-2 into the target audio 170-2. In some embodiments, the speech translation model 120 may be obtained through unsupervised training based on a decoder-only architecture, using the source audio 160 and target audio 170 to construct input data.

Referring to FIG. 1, the speech translation model 120 includes a semantic feature extractor 130. By utilizing the semantic feature extractor 130, raw audio may be converted into a semantic unit sequence. It should be noted that the semantic unit sequence is related to the textual content corresponding to the audio, but is not an actual text, and instead, is a sequence of some discrete digital units. Therefore, the semantic feature extractor may process unwritten languages. The obtained semantic unit sequence may be used in the subsequent decoder training process. In this embodiment of the disclosure, the semantic feature extractor 130 is a pre-trained model that can directly extract the semantic unit sequence of the audio without the need for further training. In the process of training a decoder 140, a decoder 145, and a decoder 150, relevant model parameters in the semantic feature extractor 130 remain unchanged.

The speech translation model 120 further includes the decoder 140. The decoder 140 may convert a source semantic unit sequence of source language audio into a target semantic unit sequence of target language audio. During training the decoder 140, both the source semantic unit sequence and the target semantic unit sequence from training data are simultaneously inputted into the decoder 140 for model training through unsupervised training.

The speech translation model 120 further includes the decoder 145. The decoder 145 may restore timbre information from the source audio 160 into the target semantic unit sequence generated by the decoder 140 so as to be ultimately preserved in the generated target audio 170. It should be understood that in some embodiments, the speech translation model 120 may still achieve the function of speech translation without the decoder 145.

The speech translation model 120 further includes the decoder 150. The decoder 150 may convert the target semantic unit sequence of the target language audio into a target acoustic unit sequence of the target language audio. During training the decoder 150, the source semantic unit sequence, the target semantic unit sequence, a source acoustic unit sequence, and the target acoustic unit sequence from the training data are simultaneously inputted into the decoder 150 for model adjustment through unsupervised training, where the source acoustic unit sequence and the target acoustic unit sequence may be extracted using an audio stream encoder.

Both the decoder 140 and the decoder 150 may be language models only using a decoder structure, and therefore may utilize a prompt sequence related to included source audio information and target audio information for unsupervised training. In the unsupervised training process, parameters of the decoder 140 and the decoder 150 are adjusted by maximizing the probability of a next unit predicted by a prediction sequence from left to right. In an inference stage, the prompt sequence related to the included source audio information may be inputted into the decoder 140 and the decoder 150 to generate the target acoustic sequence associated with the target audio.

It should be understood that the architecture and functions in the example environment 100 are described for illustrative purposes only, and do not imply any limitations on the scope of the disclosure. This embodiment of the disclosure may also be applied to other environments with different structures and/or functions.

The process according to this embodiment of the disclosure is described in detail in conjunction with FIG. 2 to FIG. 9 below. For ease of understanding, specific data mentioned below is exemplary and is not intended to limit the scope of protection of the disclosure. It should be understood that the embodiments described below may also include additional actions not shown and/or may omit shown actions, and the scope of the disclosure is not limited in such aspect.

Figure 2:
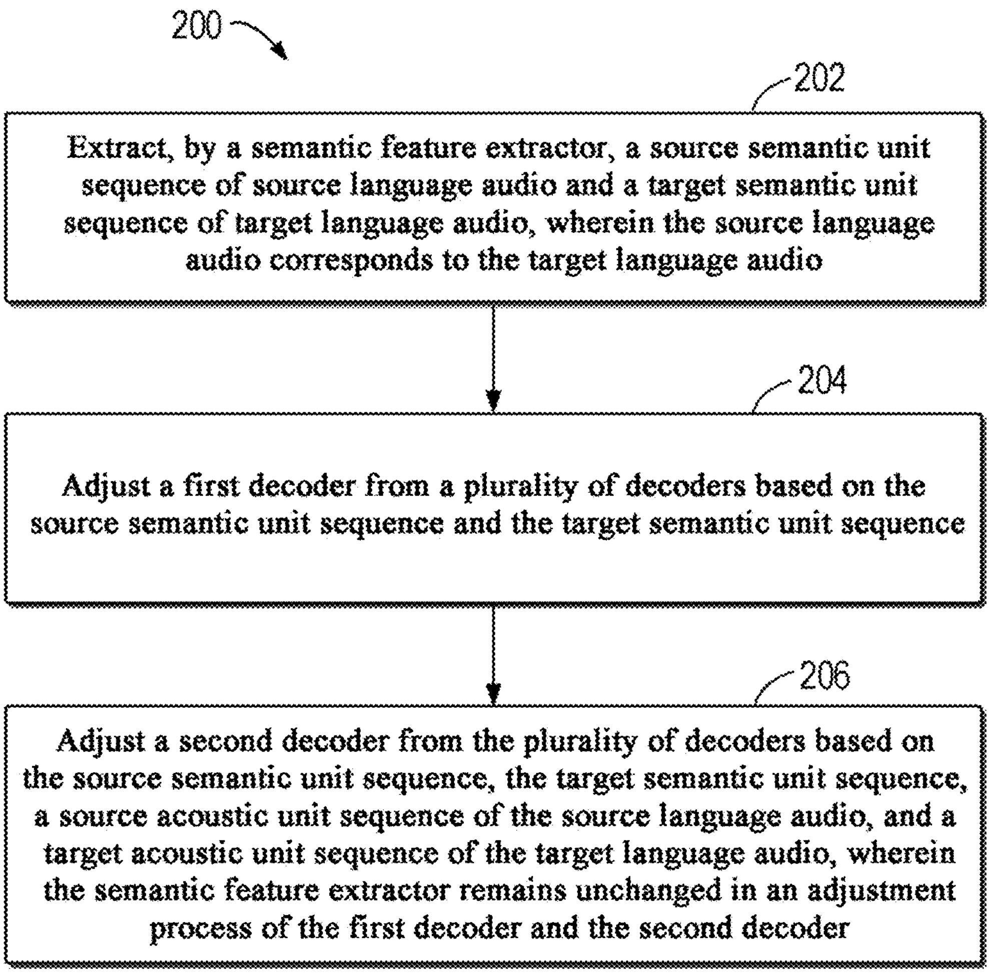
FIG. 2 illustrates a flowchart of a method for generating a speech translation model according to some embodiments of the disclosure.

FIG. 2 illustrates a flowchart of a method 200 for generating a speech translation model according to some embodiments of the disclosure. The speech translation model includes a semantic feature extractor and a plurality of decoders. In a block 202, the semantic feature extractor extracts a source semantic unit sequence of source language audio and a target semantic unit sequence of target language audio, and the source language audio corresponds to the target language audio. For example, as shown in FIG. 1, the speech translation model 120 acquires the source audio 160 and the target audio 170 in different languages corresponding to semantics. It should be understood that in a model training stage, both the source audio 160 and the target audio 170 are available without the need for generating the target audio 170 through the source audio 160. It should be understood that in the inference stage, the speech translation model 120 may generate the target audio 170 based on the source audio 160.

In a block 204, a first decoder of the plurality of decoders is adjusted based on the source semantic unit sequence and the target semantic unit sequence. For example, referring to FIG. 1, model parameters of the decoder 140 are adjusted through the source semantic unit sequence and the target semantic unit sequence. It should be understood that the semantic unit sequence here is related to a text corresponding to the audio. For example, similar semantic unit sequences correspond to similar audio content, independent of acoustic features such as an audio duration, frequency, and timbre.

In a block 206, a second decoder of the plurality of decoders is adjusted based on the source semantic unit sequence, the target semantic unit sequence, the source acoustic unit sequence of the source language audio, and the target acoustic unit sequence of the target language audio, where the semantic feature extractor remains unchanged during the adjustment of the first decoder and the second decoder. For example, referring to FIG. 1, the decoder 150 is adjusted based on the source semantic unit sequence, the target semantic unit sequence, the source acoustic unit sequence of the source language audio, and the target acoustic unit sequence of the target language audio. It should be understood that model parameters of the decoder 150 may be adjusted through the semantic unit sequence and the acoustic unit sequence. It should be understood that the acoustic unit sequences are incorporated when adjusting the decoder 150, and therefore the decoder 150 learns audio-related features, such as a speech pattern, frequency, and timbre.

Therefore, according to the method 200 in this embodiment of the disclosure, when the speech translation model is generated, only the plurality of decoders in the semantic translation model are trained, thereby reducing model training parameters, improving training efficiency, lowering engineering implementation requirements such as hardware configuration, and also improving a speech translation effect.

Figure 3:
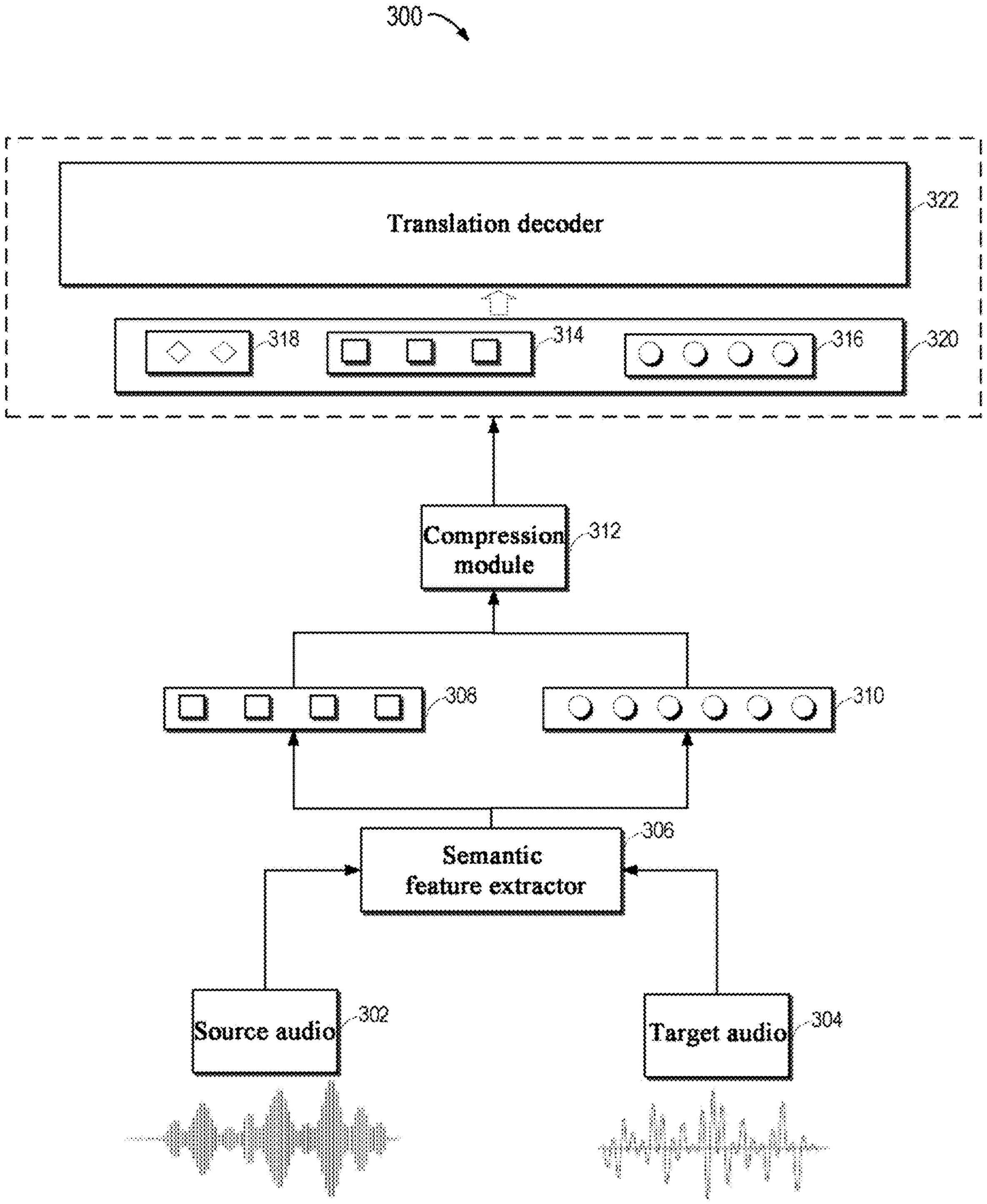
FIG. 3 illustrates a schematic diagram of a process for training a translation decoder according to some embodiments of the disclosure.
Figure 4:
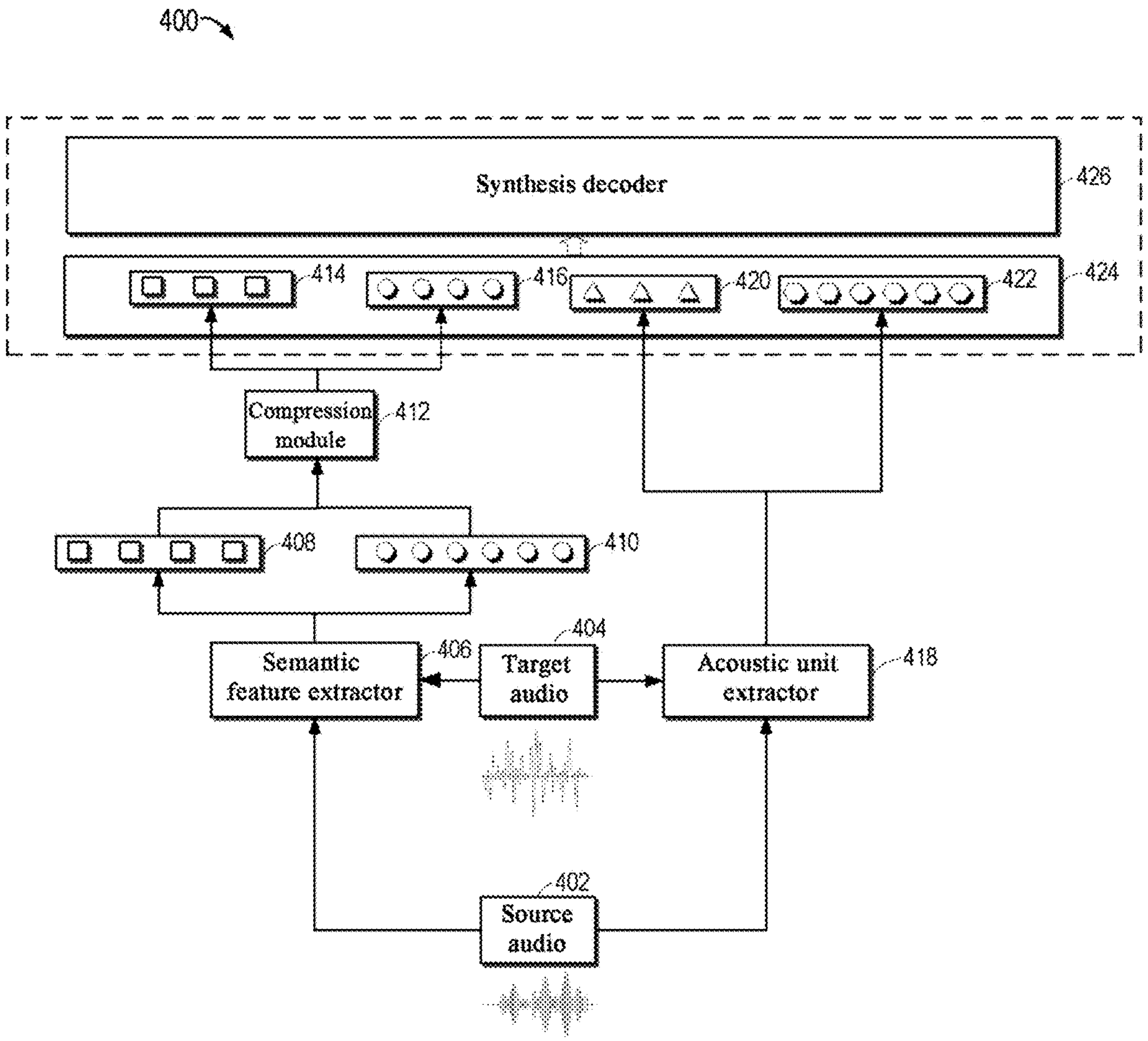
FIG. 4 illustrates a schematic diagram of a process for training a synthesis decoder according to some embodiments of the disclosure.
Figure 5:
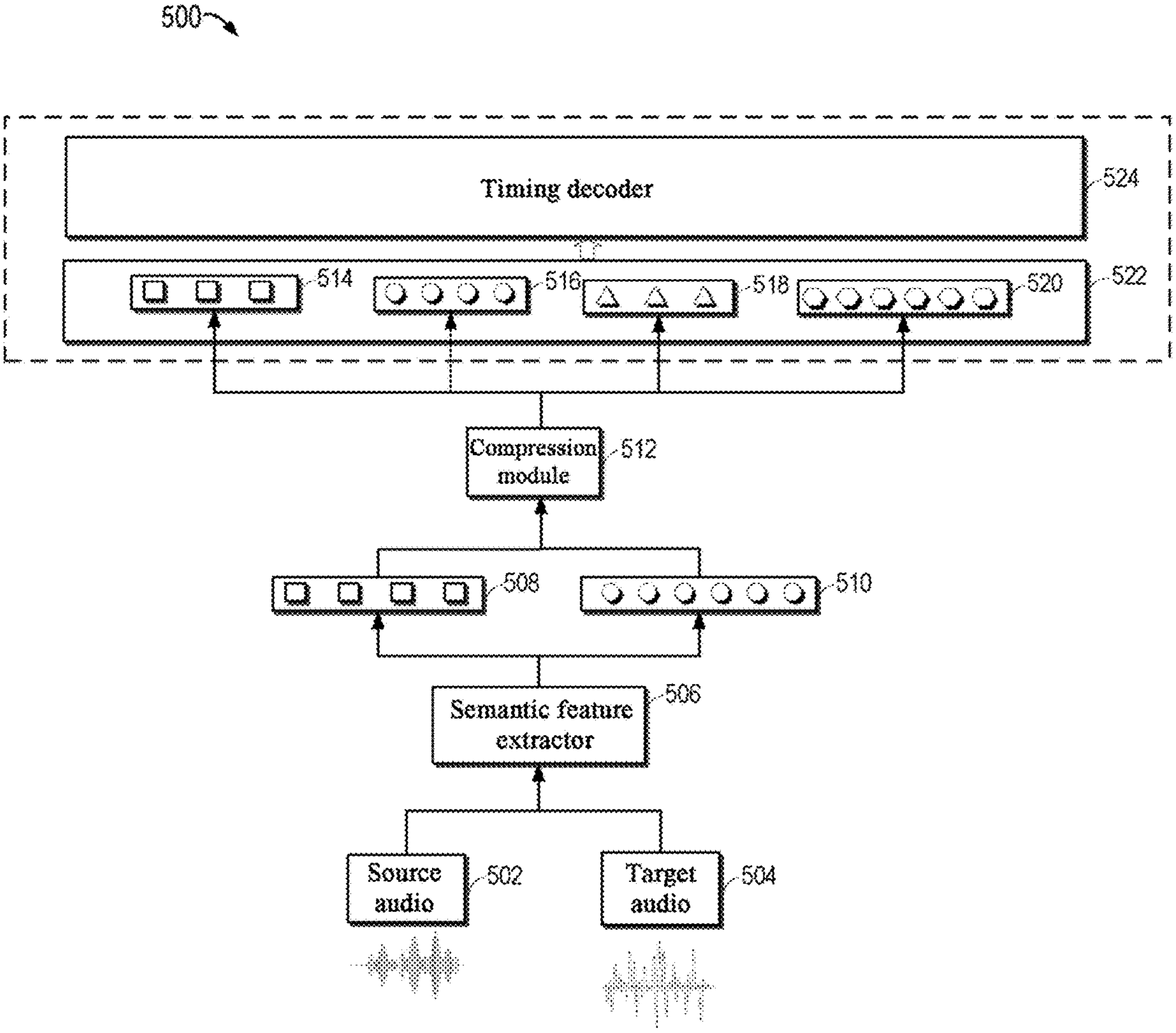
FIG. 5 illustrates a flowchart of a process for training a timing decoder according to some embodiments of the disclosure.

The training process of the plurality of decoders is specifically described below in conjunction with FIG. 3 to FIG. 5. FIG. 3 illustrates a training process of a translation decoder. The translation decoder may be the decoder 140 in FIG. 1, and is configured to translate the source semantic unit sequence into the target semantic unit sequence. FIG. 4 illustrates a training process of a synthesis decoder. The synthesis decoder may be the decoder 150 in FIG. 1, and is configured to synthesize the target semantic unit sequence into the target acoustic unit sequence. FIG. 5 illustrates a training process of a timing decoder. The timing decoder may be the decoder 145 in FIG. 1, and is configured to restore the compressed target semantic unit sequence.

FIG. 3 illustrates a schematic diagram of a process 300 for training a translation decoder according to some embodiments of the disclosure. Firstly, source audio 302 and target audio 304 are acquired. For example, the source audio 302 may be English audio, and the target audio 304 may be Chinese audio corresponding to the English audio. It should be understood that although the description is given with English as the source audio and Chinese as the target audio, speech conversion between other languages may also be used in conjunction with the embodiments of the disclosure. Semantic features of the source audio 302 and the target audio 304 are extracted through a semantic feature extractor 306. The semantic feature extractor 306 may include a self-supervised speech representation learning model and a cluster model to convert the source audio 302 and the target audio 304 into a source semantic unit sequence 308 and a target semantic unit sequence 310. In the process of training a translation encoder, parameters of the semantic feature extractor 306 remain unchanged. It should be understood that both the source semantic unit sequence 308 and the target semantic unit sequence 310 are discrete unit sequences, where each unit corresponds to a numerical value. Therefore, the whole process does not involve converting audio to text.

The source semantic unit sequence 308 and the target semantic unit sequence 310 are processed by a compression module 312 to obtain a compressed source semantic unit sequence 316 and a compressed target semantic unit sequence 318. For example, due to some repetitions, pauses, etc. in the audio, the compression module 312 removes this part of redundant information, thereby improving an effect of the translation decoder 322. However, it should be understood that the compression module 312 is optional. In other words, in some embodiments, the source semantic unit sequence 308 and the target semantic unit sequence 310 may not be compressed and may be directly inputted into the translation decoder 322 for training.

The compressed source semantic unit sequence 314, the compressed target semantic unit sequence 316, and task information 318 may be combined to obtain a prompt sequence 320 (also referred to as a first prompt sequence). For example, when the source audio 302 is English audio, an example of the prompt sequence 320 may be "Translate English unit {src_unit} to Chinese unit {tat_unit}", where the task information 318 is "Translate English unit . . . to Chinese unit . . . ", which indicates the translation decoder 322 to perform a task to be processed for converting an English unit to a Chinese unit. It should be understood that the language type may vary as needed, where "{src_unit}" represents the compressed source semantic unit sequence 314, and {tat_unit} represents the compressed target semantic unit sequence 316. It should be understood that placing the task information 318 at the leftmost side of the prompt sequence 320 in FIG. 3 is for the convenience of drawing. In fact, it can be seen from the above example that the task information 318 is interspersed in the compressed source semantic unit sequence 314 and the compressed target semantic unit sequence 316.

Parameters of the translation decoder 322 are trained and optimized by inputting the prompt sequence 320 into the translation decoder 322 for unsupervised training. For example, the translation decoder 322 may be subjected to unsupervised training based on the prompt sequence 320. The probability of a next prompt unit appearing on the prompt sequence 320 from left to right is predicted and maximized to train the translation decoder 322.

FIG. 4 illustrates a schematic diagram of a process 400 for training a synthesis decoder according to some embodiments of the disclosure. The translation decoder may be the decoder 150 shown in FIG. 1, which may synthesize acoustic feature sequences. The acoustic feature sequences may be converted into target audio. In FIG. 4, source audio 402 and target audio 404 are separately processed through a semantic feature extractor 406 to obtain a source semantic unit sequence 408 and a target semantic unit sequence 410. The source semantic unit sequence 408 and the target semantic unit sequence 410 are separately compressed through a compression module 412 to obtain a compressed source semantic unit sequence 414 and a compressed target semantic unit sequence 416.

The source audio 402 is processed by an acoustic unit extractor 418 to obtain a source acoustic unit sequence 420, where the source acoustic unit sequence 420 represents acoustic characteristics related to the source audio 402, such as a frequency, a timbre, and a speech pattern. Similarly, the target audio 404 is processed by the acoustic unit extractor 420 to obtain a target acoustic unit sequence 422.

By combining the compressed source semantic unit sequence 414, the compressed target semantic unit sequence 416, the source acoustic unit sequence 420, and the target acoustic unit sequence 422, a prompt sequence 424 (also known as a second prompt sequence) is obtained. Parameters of a synthesis decoder 426 are trained and optimized by inputting the prompt sequence 424 into the synthesis decoder 426 for unsupervised training. For example, the synthesis decoder 426 may be subjected to unsupervised training based on the prompt sequence 424. The probability of a next prompt unit appearing on the prompt sequence 424 from left to right is predicted and maximized to train the synthesis decoder 426.

FIG. 5 illustrates a flowchart of a process 500 for training a timing decoder according to some embodiments of the disclosure. The timing decoder may be the decoder 145 shown in FIG. 1, which may restore compressed speech units to retain a timbre of source audio in target audio. As mentioned in the process 300 for training the translation decoder, to better model the semantic unit sequences, the source semantic unit sequence 308 and the target semantic unit sequence 310 are compressed to remove some repetitions, pauses, etc. that exist in the audio. However, during generating the target audio, it is desirable to retain these repetitions and pauses from the source audio in the target audio, which requires the timing decoder to restore the compressed speech units.

As shown in FIG. 5, source audio 502 and target audio 504 are separately processed through a semantic feature extractor 506 to obtain a source semantic unit sequence 508 and a target semantic unit sequence 510. The source semantic unit sequence 508 and the target semantic unit sequence 510 are separately compressed through a compression module 512 to obtain a compressed source semantic unit sequence 514 and a compressed target semantic unit sequence 516. Additionally, a source timing value sequence 518 and a target timing value sequence 520 are obtained. For example, in some embodiments, through the semantic feature extractor 506, the source semantic unit sequence 508 with the length of 4 and the target semantic unit sequence 510 with the length of 6 are obtained and then are compressed through the compression module 512 to obtain the compressed source semantic unit sequence 514 with the length of 3 and the compressed target semantic unit sequence 516 with the length of 4. Therefore, the correspondingly obtained source timing value sequence 518 is [1, 2, 1], and is associated with a compression pattern of the compressed source semantic unit sequence 314, and the target timing value sequence 520 is [1, 2, 2, 1], and is associated with a compression pattern of the compressed target semantic unit sequence 516.

By combining the compressed source semantic unit sequence 514, the compressed target semantic unit sequence 516, the source timing value sequence 518, and the target timing value sequence 520, a prompt sequence 522 is obtained. Parameters of the timing decoder 524 are trained and optimized by inputting the prompt sequence 522 into the timing decoder 524 for unsupervised training. It should be understood that the timing decoder, similar to the translation decoder and the synthesis decoder, is trained based on a language model method. Specifically, training is performed by predicting a next unit in the sequence through a constructed input sequence.

Figure 6:
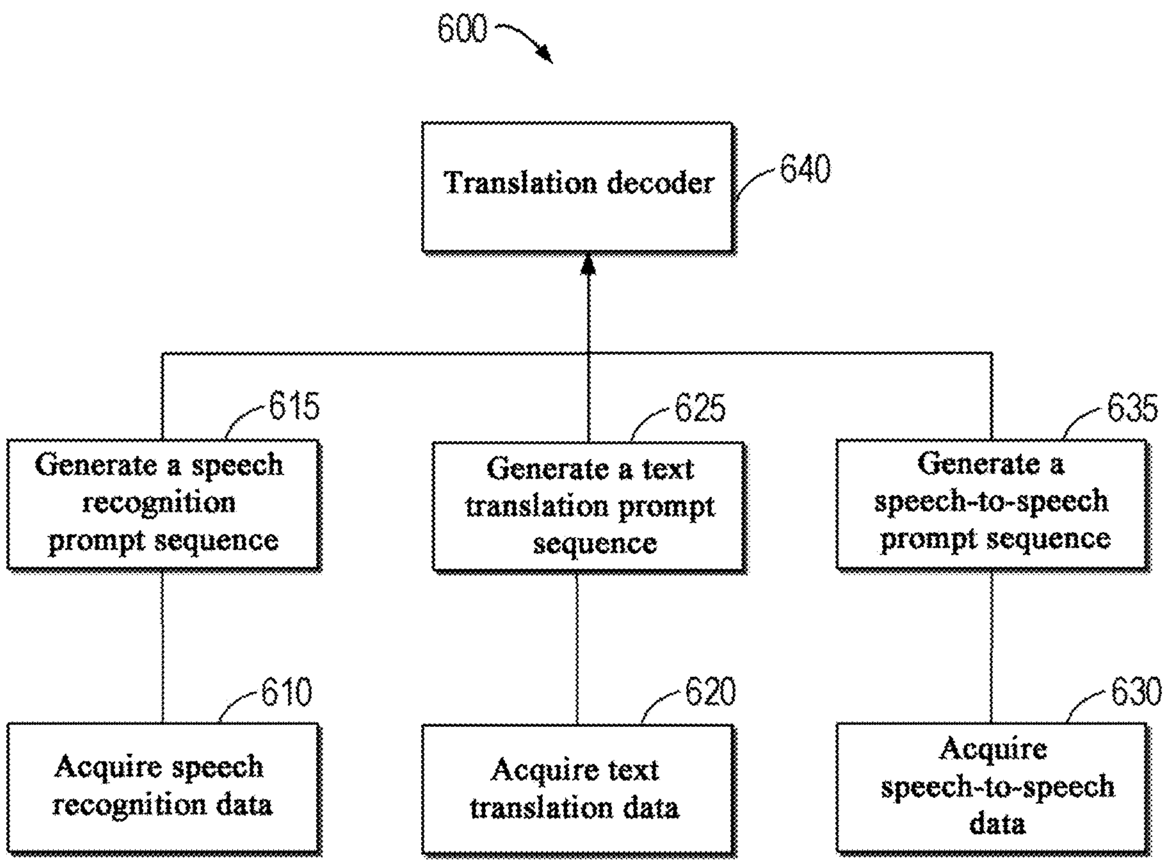
FIG. 6 illustrates a schematic diagram of a process for training a translation decoder using a multi-task learning scheme according to some embodiments of the disclosure.

FIG. 6 illustrates a schematic diagram of a process 600 for training a translation decoder using a multi-task learning scheme according to some embodiments of the disclosure. In 610, speech recognition data is acquired. It should be understood that a speech recognition task only involves a specific language type, converting audio and text of the language type. A data format of the speech recognition data is: <unit, text>, which means converting a semantic unit to a corresponding text. The semantic unit may be extracted by the semantic feature extractor 130 shown in FIG. 1. In some embodiments, data from an existing language recognition task may be acquired. In 615, a speech recognition prompt sequence is generated. For example, the speech recognition prompt sequence may be "Translate [lang] unit {unit} to [lang] text {text}". The prompt sequence is used for prompting a translation decoder 640 (i.e., the first decoder) to convert the semantic unit to the corresponding text, where "lang" is used for specifying the current language type. In addition, the speech recognition prompt sequence may also be "Translate [lang] text {text} to [lang] unit {unit}". The prompt sequence is used for prompting the translation decoder 640 to convert the text to the corresponding semantic unit. After generating the speech recognition prompt sequence, the speech recognition prompt sequence is used for adjusting the translation decoder 640 to optimize the parameters of the translation decoder 640.

In 620, text translation data is acquired. It should be understood that a text translation task involves text conversion between two types of languages without audio conversion. A data format of text translation is <src_text, tgt_text>, which means converting a source language text to a target language text. In 625, a text translation prompt sequence is generated. For example, the text translation prompt sequence may be "Translate [src lang] text {text} to [tgt lang] text {text}". The prompt sequence is used for prompting the translation decoder 640 to translate the source language text to the target language text, where "src lang" represents the language type of the source language, and "tgt lang" represents the language type of the target language. For example, the source language may be English, and the target language may be Chinese. After generating the text translation prompt sequence, the text translation prompt sequence is used for adjusting the translation decoder 640 to optimize the parameters of the translation decoder 640.

In 630, speech-to-speech data is acquired. It should be understood that a speech-to-speech task involves direct speech conversion between two types of speeches. A format of the speech-to-speech data is <src_unit, tgt_unit, src_text, tgt_text>, including a source semantic unit, a target semantic unit, a source text, and a target text. In 635, a speech-to-speech prompt sequence is generated. Typically, the speech-to-speech prompt sequence is "Translate [src lang] unit {src_unit} to [tgt lang] unit {tgt_unit}". The prompt sequence is used for prompting the translation decoder 640 to translate the source semantic unit to the target semantic unit. After generating the speech-to-speech prompt sequence, the speech-to-speech prompt sequence is used for adjusting the translation decoder 640 to optimize the parameters of the translation decoder 640. Because the speech-to-speech data includes totally four types of data: a source semantic unit, a target semantic unit, a source text, and a target text, the following prompt sequences may also be constructed:

"Translate [src lang] unit {src_unit} to [src lang] text {src_text}", and the prompt sequence is used for prompting the translation decoder 640 to translate the source semantic unit to the source text;

"Translate [src lang] unit {src_unit} to [tgt lang] text {tgt_text}", and the prompt sequence is used for prompting the translation decoder 640 to translate the source semantic unit to the target text;

"Translate [src lang] text {src_text} to [tgt lang] unit {tgt_unit}", and the prompt sequence is used for prompting the translation decoder 640 to translate the source text to the target semantic unit; and "Translate [tgt lang] text {tgt_text} to [tgt lang] unit {tgt_unit}", and the prompt sequence is used for prompting the translation decoder 640 to translate the target text to the target semantic unit.

It can be seen that by utilizing the multi-task learning scheme, various task types of data may be used, such as any one or more of speech recognition data 610, text translation data 620, and speech-to-speech data 630, so as to adjust the parameters of the translation decoder 640, thereby improving the performance and effect of the translation decoder 640.

Figure 7:
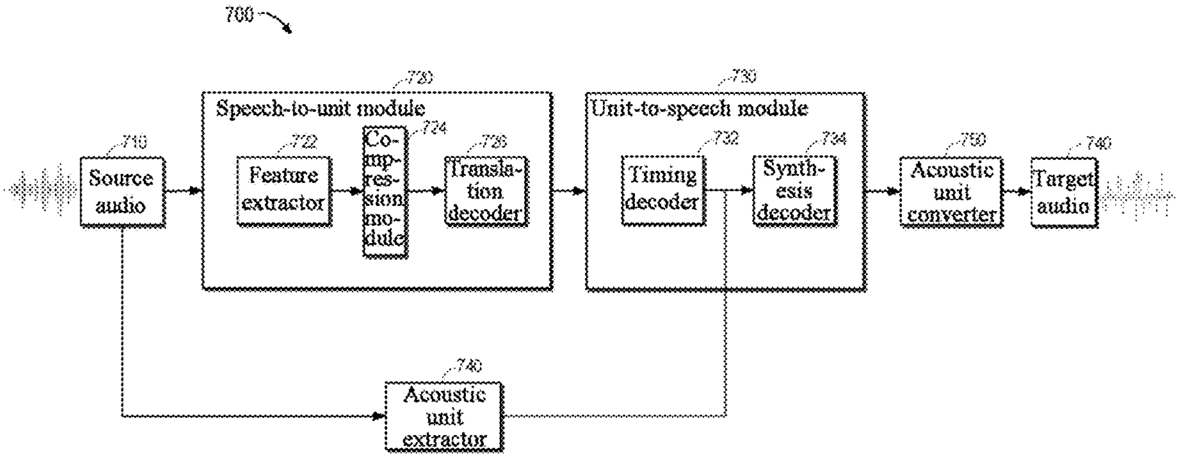
FIG. 7 illustrates a schematic diagram of a process for speech translation from source audio to target audio according to some embodiments of the disclosure.

FIG. 7 illustrates a schematic diagram of a process 700 for speech translation from source audio to target audio according to some embodiments of the disclosure. In FIG. 3 to FIG. 5, example training processes for the plurality of decoders in the speech translation model 120 in FIG. 1 are mainly described, and in FIG. 7, how to utilize the speech translation model 120 to convert the source audio to the target audio is discussed. As shown in FIG. 7, source audio 710 is first acquired. For example, the source audio may be audio of the language types such as Chinese, English, and German. In some embodiments, the source audio 710 may be audio in an unwritten language. The unwritten language refers to a language without a written form, such as some dialects or minority languages. Processing is performed through a speech-to-unit module 720. For example, a semantic feature extractor 722 first extracts a semantic unit sequence from the source audio, where the semantic feature extractor 722 may include a self-supervised speech representation learning model and a cluster model to extract a discrete source semantic unit sequence from the source audio 710. Then, the source semantic unit sequence is compressed by a compression module 724 to obtain a compressed source semantic unit sequence. Due to some repetitions, pauses, etc. in the source audio, the compression module 724 removes this part of redundant information, thereby improving an effect of a translation decoder 726. A prompt sequence is obtained by combining the compressed source semantic unit sequence with task information. For example, the prompt sequence may be "Translate [src lang] unit {src_unit} to [tgt lang] unit". That is, the prompt sequence includes the language type of the source audio 710 "src lang", the compressed source semantic unit sequence "{src_unit}", the target audio language type "tgt lang", and the task type "unit to unit", and therefore the translation decoder 726 generates a target semantic unit sequence based on the prompt sequence. Since the input is the compressed source semantic unit sequence, the output is actually a compressed target semantic unit sequence.

Then, processing continues with a unit-to-speech module 730. For example, the compressed target semantic unit sequence is processed through a decoder 732 to obtain a target semantic unit sequence, thereby restoring timbre information from the source audio 710 into the target semantic unit sequence. Then, an acoustic feature extractor 740 is utilized for extracting a source acoustic unit sequence from the source audio, and combining the source semantic unit sequence, the target semantic unit sequence, and the source acoustic unit sequence into another prompt sequence, and inputting the another prompt sequence into a synthesis decoder 734 to generate a target acoustic unit sequence. An acoustic unit converter 750 processes the target acoustic unit sequence to obtain predicted target audio 740.

Figure 8:
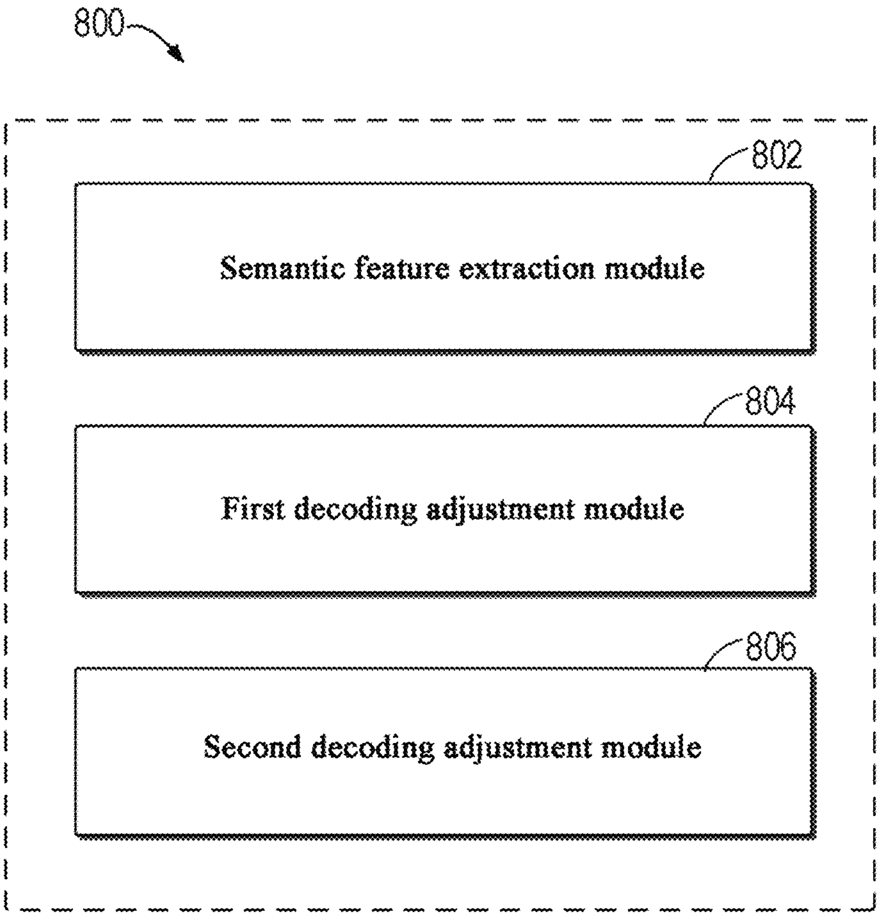
FIG. 8 illustrates a block diagram of an apparatus for generating a speech translation model according to some embodiments of the disclosure.

FIG. 8 illustrates a block diagram of an apparatus 800 for generating a speech translation model according to some embodiments of the disclosure. As shown in FIG. 8, the apparatus 800 includes a semantic feature extraction module 802, configured to extract a source semantic unit sequence of source language audio and a target semantic unit sequence of target language audio, where the source language audio corresponds to the target language audio. The apparatus 800 further includes a first decoding adjustment module 804, configured to adjust a first decoder from a plurality of decoders based on the source semantic unit sequence and the target semantic unit sequence. In addition, the apparatus 800 further includes a second decoding adjustment module 806, configured to adjust a second decoder of the plurality of decoders based on the source semantic unit sequence, the target semantic unit sequence, a source acoustic unit sequence of the source language audio, and a target acoustic unit sequence of the target language audio, where the semantic feature extractor remains unchanged during the adjustment of the first decoder and the second decoder.

Therefore, according to the apparatus 800 in the disclosure, when the speech translation model is generated, only the decoders are trained, thereby reducing model training parameters, improving training efficiency, lowering engineering implementation requirements such as hardware configuration, and also improving a speech translation effect.

Figure 9:
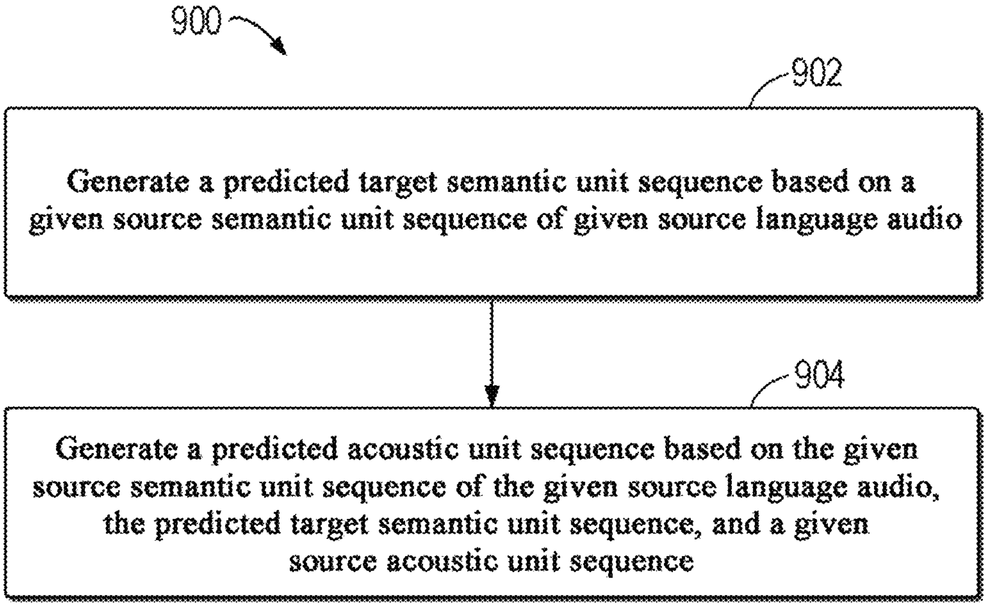
FIG. 9 illustrates a flowchart of a method for speech translation according to some embodiments of the disclosure.

FIG. 9 illustrates a flowchart of a method 900 for speech translation according to some embodiments of the disclosure. The method 900 may be performed by the speech translation model generated by the method 200 in FIG. 2. The speech translation model includes a semantic feature extractor and a plurality of decoders. In a block 902, a predicted target semantic unit sequence is generated based on a given source semantic unit sequence of given source language audio. In a block 904, a predicted acoustic unit sequence is generated based on the given source semantic unit sequence of the given source language audio, the predicted target semantic unit sequence, and a given source acoustic unit sequence.

Figure 10:
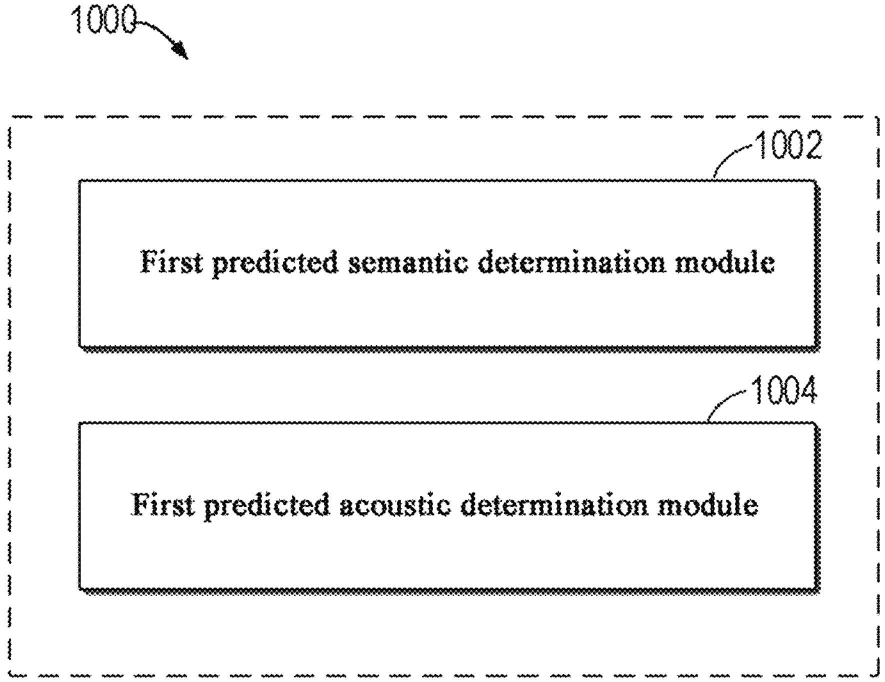
FIG. 10 illustrates a block diagram of an apparatus for speech translation according to some embodiments of the disclosure.

FIG. 10 illustrates a block diagram of an apparatus 1000 for speech translation according to some embodiments of the disclosure. As shown in FIG. 10, the apparatus 1000 includes a first predicted semantic determination module 1002, configured to generate a predicted target semantic unit sequence based on a given source semantic unit sequence of given source language audio. The apparatus 1000 further includes a first predicted acoustic determination module 1004, configured to generate a predicted acoustic unit sequence based on the given source semantic unit sequence of the given source language audio, the predicted target semantic unit sequence, and a given source acoustic unit sequence.

Figure 11:
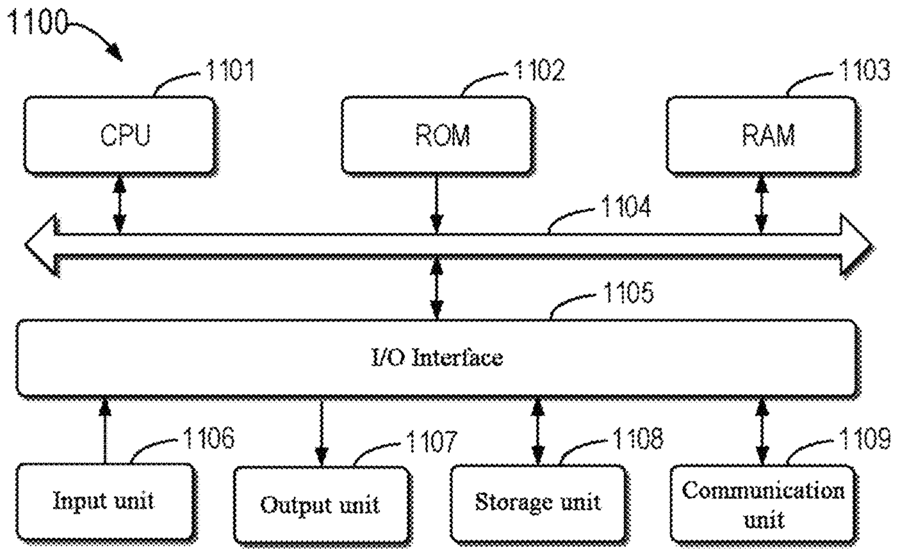
FIG. 11 illustrates a block diagram of an electronic device according to some embodiments of the disclosure.

FIG. 11 illustrates a block diagram of an electronic device 1100 according to some embodiments of the disclosure. The device 1100 may be a device or apparatus described in the embodiments of the disclosure. As shown in FIG. 11, the device 1100 includes a central processing unit (CPU) and/or a graphics processing unit (GPU) 1101, which may perform various appropriate actions and processes according to computer program instructions stored in a read-only memory (ROM) 1102 or computer program instructions loaded from a storage unit 1108 into a random access memory (RAM) 1103. Various programs and data required for the operation of the device 1100 may also be stored in the RAM 1103. The CPU/GPU 1101, the ROM 1102, and the RAM 1103 are connected with one another through a bus 1104. An input/output (I/O) interface 1105 is also connected to the bus 1104. Although not shown in FIG. 11, the device 1100 may also include a coprocessor.

A plurality of components in the device 1100 are connected to the I/O interface 1105, including an input unit 1106 such as a keyboard and a mouse; an output unit 1107 such as various types of displays and speakers; the storage unit 1108 such as a disk and an optical disc; and a communication unit 1109 such as a network card, a modem, and a wireless communication transceiver. The communication unit 1109 allows the device 1100 to exchange information/data with other devices through a computer network such as the Internet, and/or various telecommunication networks.

The various methods or processes described above may be executed by the CPU/GPU 1101. For example, in some embodiments, the method may be implemented as a computer software program that is tangibly included in a machine-readable medium, such as the storage unit 1108. In some embodiments, part or all of the computer program may be loaded and/or installed onto the device 1100 via the ROM 1102 and/or the communication unit 1109. When the computer program is loaded into the RAM 1103 and executed by the CPU/GPU 1101, one or more of steps or actions of the method or process described above may be performed.

In some embodiments, the methods and processes described above may be implemented as a computer program product. The computer program product may include a computer-readable storage medium carrying computer-readable program instructions for performing various aspects of the disclosure.

The computer-readable storage medium may be a tangible device that may retain and store instructions used by an instruction-executing device. The computer-readable storage medium may be, for example, but is not limited to, an electric storage device, a magnetic storage device, an optical storage device, an electromagnetic storage device, a semiconductor storage device, or any suitable combination of the above. More specific examples (non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, such as a punch card or a raised structure in a groove with instructions stored therein, or any suitable combination of the above. The computer-readable storage medium used here is not to be interpreted as transient signals, such as radio waves or other freely propagating electromagnetic waves, electromagnetic waves propagated through waveguides or other transmission media (e.g., light pulses through fiber-optic cables), or electrical signals transmitted through wires.

The computer-readable program instructions described herein may be downloaded from the computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives the computer-readable program instructions from the network and forwards the computer-readable program instructions for storage in the computer-readable storage medium in each computing/processing device.

The computer program instructions for performing the operation of the disclosure may be assembly instructions, instruction set architecture (ISA) instructions, machine instructions, machine-dependent instructions, microcode, firmware instructions, status setting data, or source code or object code written in any combination of one or more programming languages, where the programming languages include object-oriented programming languages and conventional procedural programming languages. The computer-readable program instructions may be executed entirely on a user computer, partly on the user computer, as a stand-alone software package, partly on the user computer and partly on a remote computer, or entirely on the remote computer or the server. In the case of involving the remote computer, the remote computer may be connected to the user computer through any type of network, including a local area network (LAN) or wide area network (WAN), or may be connected to the external computer (e.g., utilizing an Internet service provider for Internet connectivity). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the disclosure.

These computer-readable program instructions may be provided to a processing unit of a general-purpose computer, a special-purpose computer, or another programmable data processing apparatus, thereby producing a machine, such that these instructions, when executed by the processing unit of the computer or the another programmable data processing apparatus, produce an apparatus for implementing functions/actions specified in one or more blocks in the flowcharts and/or block diagrams. These computer-readable program instructions may also be stored in the computer-readable storage medium, and these instructions make the computer, the programmable data processing apparatus, and/or another device operate in a specific method; and therefore, the computer-readable medium having instructions stored therein includes an article of manufacture that includes instructions for implementing various aspects of the functions/actions specified in one or more blocks in the flowcharts and/or block diagrams.

The computer-readable program instructions may also be loaded to the computer, the another programmable data processing apparatus, or the another device, such that a series of operating steps are performed on the computer, the another programmable data processing apparatus, or the another device to produce a computer-implemented process, and accordingly, the instructions executed on the computer, the another programmable data processing apparatus, or the another device implement the functions/actions specified in one or more blocks in the flowcharts and/or block diagrams.

The flowcharts and the block diagrams in the accompanying drawings illustrate the system architectures, functions, and operations possibly implemented by the device, the method and the computer program product according to the various embodiments of the disclosure. In this regard, each block in the flowcharts or the block diagrams may represent a module, a program segment, or a portion of code, and the module, program segment, or portion of code includes one or more executable instructions for implementing specified logical functions. In some alternative implementations, functions marked in the blocks may also occur in an order different from that marked in the accompanying drawings. For example, two successive blocks may actually be executed in parallel substantially, and sometimes may also be executed in a reverse order, which depends on involved functions. It should be further noted that each block in the block diagrams and/or the flowcharts, as well as a combination of the blocks in the block diagrams and/or the flowcharts may be implemented by utilizing a dedicated hardware-based system that executes specified functions or actions, or using a combination of special hardware and computer instructions.

The embodiments of the disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of the terms as used herein is intended to best explain the principles and practical applications of the various embodiments, or improvements to technologies on the market, or to enable other persons of ordinary skill in the art to understand the various embodiments disclosed herein.

Some example implementations of the disclosure are listed below.

Example 1. A method for generating a speech translation model, where the speech translation model includes a semantic feature extractor and a plurality of decoders, and the method includes:

extracting, by the semantic feature extractor, a source semantic unit sequence of source language audio and a target semantic unit sequence of target language audio, where the source language audio corresponds to the target language audio;

adjusting a first decoder of the plurality of decoders based on the source semantic unit sequence and the target semantic unit sequence; and adjusting a second decoder of the plurality of decoders based on the source semantic unit sequence, the target semantic unit sequence, a source acoustic unit sequence of the source language audio, and a target acoustic unit sequence of the target language audio, where the semantic feature extractor remains unchanged during the adjustment of the first decoder and the second decoder.

Example 2. The method according to example 1, where adjusting the first decoder of the plurality of decoders includes:

obtaining a first prompt sequence by combining the source semantic unit sequence, the target semantic unit sequence, and task information, where the task information at least specifies the language type of the source language audio and the language type of the target language audio; and adjusting the first decoder based on the first prompt sequence.

Example 3. The method according to any one of examples 1 to 2, where adjusting the second decoder of the plurality of decoders includes:

obtaining a second prompt sequence by combining the source semantic unit sequence, the target semantic unit sequence, the source acoustic unit sequence, and the target acoustic unit sequence; and adjusting the second decoder based on the second prompt sequence.

Example 4. The method according to any one of examples 1 to 3, further includes:

obtaining a compressed source semantic unit sequence and a compressed target semantic unit sequence by compressing the source semantic unit sequence and the target semantic unit sequence; and adjusting the first decoder by utilizing the compressed source semantic unit sequence, the compressed target semantic unit sequence, and the task information.

Example 5. The method according to any one of examples 1 to 4, further includes:

obtaining a source timing value sequence and a target timing value sequence by compressing the source semantic unit sequence and the target semantic unit sequence, where the source timing value sequence and the target timing value sequence are associated with a compression pattern; and adjusting a third decoder of the plurality of decoders by utilizing the compressed source semantic unit sequence, the compressed target semantic unit sequence, the source timing value sequence, and the target timing value sequence.

Example 6. The method according to any one of examples 1 to 5, where the semantic feature extractor includes any one of an unsupervised model and a cluster model.

Example 7. The method according to any one of examples 1 to 6, further includes adjusting the first decoder using multi-task learning, where the multi-task learning includes at least one of the following:

a speech recognition task;

a text translation task; or a speech-to-speech conversion task.

Example 8. The method according to any one of examples 1 to 7, where at least one of the source language audio and the target language audio includes an unwritten language, and the unwritten language has no handwritten text.

Example 9. A method for speech translation, where the method is performed by the speech translation model generated by any one of examples 1 to 8, the speech translation model includes a semantic feature extractor and a plurality of decoders, and the method includes:

a predicted target semantic unit sequence is generated based on a given source semantic unit sequence of given source language audio; and generating a predicted acoustic unit sequence based on the given source semantic unit sequence of the given source language audio, the predicted target semantic unit sequence, and a given source acoustic unit sequence.

Example 10. The method according to example 9, where generating the predicted target semantic unit sequence includes:

obtaining a first predicted prompt sequence by combining the given source semantic unit sequence and task information; and generating the predicted target semantic unit sequence by inputting the first predicted prompt sequence into the first decoder of the plurality of decoders.

Example 11. The method according to any one of examples 9 to 10, where generating the predicted acoustic unit sequence includes:

obtaining a second predicted prompt sequence by combining the given source semantic unit sequence, the predicted target semantic unit sequence, and the given source acoustic unit sequence; and generating the predicted acoustic unit sequence by inputting the second predicted prompt sequence into the second decoder of the plurality of decoders.

Example 12. The method according to any one of examples 9 to 11, further includes:

generating predicted target language audio based on the predicted acoustic unit sequence.

Example 13. An apparatus for generating a speech translation model, where the speech translation model includes a semantic feature extractor and a plurality of decoders, and the apparatus includes:

a semantic feature extraction module, configured to extract a source semantic unit sequence of source language audio and a target semantic unit sequence of target language audio, where the source language audio corresponds to the target language audio;

a first decoding adjustment module, configured to adjust a first decoder of the plurality of decoders based on the source semantic unit sequence and the target semantic unit sequence; and a second decoding adjustment module, configured to adjust a second decoder of the plurality of decoders based on the source semantic unit sequence, the target semantic unit sequence, a source acoustic unit sequence of the source language audio, and a target acoustic unit sequence of the target language audio, where the semantic feature extractor remains unchanged during the adjustment of the first decoder and the second decoder.

Example 14. The apparatus according to example 13, where the first decoding adjustment module includes:

a first prompt sequence determination module, configured to obtain a first prompt sequence by combining the source semantic unit sequence, the target semantic unit sequence, and task information, where the task information at least specifies the language type of the source language audio and the language type of the target language audio; and a third decoding adjustment module, configured to adjust the first decoder based on the first prompt sequence.

Example 15. The apparatus according to any one of examples 13 to 14, where the second decoding adjustment module includes:

a second prompt sequence determination module, configured to obtain a second prompt sequence by combining the source semantic unit sequence, the target semantic unit sequence, the source acoustic unit sequence, and the target acoustic unit sequence; and a fourth decoding adjustment module, configured to adjust the second decoder based on the second prompt sequence.

Example 16. The apparatus according to any one of examples 13 to 15, further includes:

a compression unit determination module, configured to obtain a compressed source semantic unit sequence and a compressed target semantic unit sequence by compressing the source semantic unit sequence and the target semantic unit sequence; and a fifth decoding adjustment module, configured to adjust the first decoder by utilizing the compressed source semantic unit sequence, the compressed target semantic unit sequence, and the task information.

Example 17. The apparatus according to any one of examples 13 to 16, further includes:

a timing value sequence determination module, configured to obtain a source timing value sequence and a target timing value sequence by compressing the source semantic unit sequence and the target semantic unit sequence, where the source timing value sequence and the target timing value sequence are associated with a compression pattern; and a sixth decoding adjustment module, configured to adjust a third decoder of the plurality of decoders by utilizing the compressed source semantic unit sequence, the compressed target semantic unit sequence, the source timing value sequence, and the target timing value sequence.

Example 18. The apparatus according to any one of examples 13 to 17, where the semantic feature extraction module includes one of an unsupervised model and a cluster model.

Example 19. The apparatus according to any one of examples 13 to 18, further includes:

a seventh decoding adjustment module, configured to adjust the first decoder using multi-task learning, where the multi-task learning includes at least one of the following:

a speech recognition task;

a text translation task; or a speech-to-speech conversion task.

Example 20. The apparatus according to any one of examples 13 to 19, where at least one of the source language audio and the target language audio includes an unwritten language, and the unwritten language has no handwritten text.

Example 21. An apparatus for translation, where the apparatus is configured to use the speech translation model generated by any one of examples 13 to 20, the speech translation model includes a semantic feature extractor and a plurality of decoders, and the apparatus includes:

a first predicted semantic determination module, configured to generate a predicted target semantic unit sequence based on a given source semantic unit sequence of given source language audio; and a first predicted acoustic determination module, configured to generate a predicted acoustic unit sequence based on the given source semantic unit sequence of the given source language audio, the predicted target semantic unit sequence, and a given source acoustic unit sequence.

Example 22. The apparatus according to example 21, where a first target semantic determination module includes:

a first predicted prompt sequence determination module, configured to obtain a first predicted prompt sequence by combining the given source semantic unit sequence and task information; and a second predicted semantic determination module, configured to generate the predicted target semantic unit sequence by inputting the first predicted prompt sequence into the first decoder of the plurality of decoders.

Example 23. The apparatus according to any one of examples 21 to 22, where a first target acoustic determination module includes:

a first predicted prompt sequence determination module, configured to obtain a second predicted prompt sequence by combining the given source semantic unit sequence, the predicted target semantic unit sequence, and the given source acoustic unit sequence; and a second predicted acoustic determination module, configured to generate the predicted acoustic unit sequence by inputting the second predicted prompt sequence into the second decoder of the plurality of decoders.

Example 24. The apparatus according to any one of examples 21 to 23, further includes:

a predicted target audio determination module, configured to generate predicted target language audio based on the predicted acoustic unit sequence.

Example 25. An electronic device, includes:

a processor; and a memory coupled with the processor, where the memory has instructions stored therein, the instructions, when executed by the processor, enable the electronic device to perform actions, the actions are used for generating a speech translation model, the speech translation model includes a semantic feature extractor and a plurality of decoders, and the actions include:

extracting, by the semantic feature extractor, a source semantic unit sequence of source language audio and a target semantic unit sequence of target language audio, where the source language audio corresponds to the target language audio;

adjusting a first decoder of the plurality of decoders based on the source semantic unit sequence and the target semantic unit sequence; and adjusting a second decoder of the plurality of decoders based on the source semantic unit sequence, the target semantic unit sequence, a source acoustic unit sequence of the source language audio, and a target acoustic unit sequence of the target language audio, where the semantic feature extractor remains unchanged during the adjustment of the first decoder and the second decoder.

Example 26. The electronic device according to example 25, where adjusting the first decoder of the plurality of decoders includes:

obtaining a first prompt sequence by combining the source semantic unit sequence, the target semantic unit sequence, and task information, where the task information at least specifies the language type of the source language audio and the language type of the target language audio; and adjusting the first decoder based on the first prompt sequence.

Example 27. The electronic device according to any one of examples 25 to 26, where adjusting the second decoder of the plurality of decoders includes:

obtaining a second prompt sequence by combining the source semantic unit sequence, the target semantic unit sequence, the source acoustic unit sequence, and the target acoustic unit sequence; and adjusting the second decoder based on the second prompt sequence.

Example 28. The electronic device according to any one of examples 25 to 27, where the actions further include:

obtaining a compressed source semantic unit sequence and a compressed target semantic unit sequence by compressing the source semantic unit sequence and the target semantic unit sequence; and adjusting the first decoder by utilizing the compressed source semantic unit sequence, the compressed target semantic unit sequence, and the task information.

Example 29. The electronic device according to any one of examples 25 to 28, where the actions further include:

obtaining a source timing value sequence and a target timing value sequence by compressing the source semantic unit sequence and the target semantic unit sequence, where the source timing value sequence and the target timing value sequence are associated with a compression pattern; and adjusting a third decoder of the plurality of decoders by utilizing the compressed source semantic unit sequence, the compressed target semantic unit sequence, the source timing value sequence, and the target timing value sequence.

Example 30. The electronic device according to any one of examples 25 to 29, where the semantic feature extractor includes one of an unsupervised model and a cluster model.

Example 31. The electronic device according to any one of examples 25 to 30, further includes adjusting the first decoder using multi-task learning, where the multi-task learning includes at least one of the following:

a speech recognition task;

a text translation task; or a speech-to-speech conversion task.

Example 32. The electronic device according to any one of examples 25 to 31, where at least one of the source language audio and the target language audio includes an unwritten language, and the unwritten language has no handwritten text.

Example 33. An electronic device, includes:

a processor; and a memory coupled with the processor, where the memory has instructions stored therein, the instructions, when executed by the processor, enable the electronic device to perform actions, the actions are performed by the speech translation model generated in any one of examples 25 to 32, the speech translation model includes a semantic feature extractor and a plurality of decoders, and the actions include:

generating a predicted target semantic unit sequence based on a given source semantic unit sequence of given source language audio; and generating a predicted acoustic unit sequence based on the given source semantic unit sequence of the given source language audio, the predicted target semantic unit sequence, and a given source acoustic unit sequence.

Example 34. The electronic device according to any one of example 33, where generating the predicted target semantic unit sequence includes:

obtaining a first predicted prompt sequence by combining the given semantic unit sequence and task information; and generating the predicted target semantic unit sequence by inputting the first predicted prompt sequence into the first decoder of the plurality of decoders.

Example 35. The electronic device according to any one of examples 33 to 34, where generating the predicted acoustic unit sequence includes:

obtaining a second predicted prompt sequence by combining the given source semantic unit sequence, the predicted target semantic unit sequence, and the given source acoustic unit sequence; and generating the predicted acoustic unit sequence by inputting the second predicted prompt sequence into the second decoder of the plurality of decoders.

Example 36. The electronic device according to any one of examples 33 to 35, where the actions further include:

generating predicted target language audio based on the predicted acoustic unit sequence.

Example 37. A computer-readable storage medium, has one or more computer instructions stored therein, where the one or more computer instructions, when executed by a processor, implement the method according to any one of examples 1 to 12.

Example 38. A computer program product, where the computer program product is tangibly stored in a computer-readable medium and includes computer-executable instructions, and the computer-executable instructions, when executed by a device, enable the device to perform the method according to any one of examples 1 to 12.

Although the disclosure has been described by adopting language specific to structural features and/or method logical actions, it should be understood that the subject limited in the appended claims is not necessarily limited to the specific features or actions described above. On the contrary, the specific features and actions described above are merely example forms for implementing the claims.

The invention claimed is:

1. A method for generating a speech translation model, wherein the speech translation model comprises a semantic feature extractor and a plurality of decoders, and the method comprises:

extracting, by the semantic feature extractor, a source semantic unit sequence of source language audio and a first semantic unit sequence of first language audio, wherein the source language audio corresponds to the first language audio, wherein the source semantic unit sequence and the first semantic unit sequence are sequences of discrete digital units;

adjusting a first decoder of the plurality of decoders based on the source semantic unit sequence and the first semantic unit sequence; and adjusting a second decoder of the plurality of decoders based on the source semantic unit sequence, the first semantic unit sequence, a source acoustic unit sequence of the source language audio, and a first acoustic unit sequence of the first language audio, wherein the semantic feature extractor remains unchanged during the adjustment of the first decoder and the second decoder.

2. The method according to claim 1, wherein adjusting the first decoder of the plurality of decoders comprises:

obtaining a first prompt sequence by combining the source semantic unit sequence, the first semantic unit sequence, and task information, wherein the task information at least specifies a language type of the source language audio and a language type of the first language audio; and adjusting the first decoder based on the first prompt sequence.

3. The method according to claim 2, wherein adjusting the second decoder of the plurality of decoders comprises:

obtaining a second prompt sequence by combining the source semantic unit sequence, the first semantic unit sequence, the source acoustic unit sequence, and the first acoustic unit sequence; and adjusting the second decoder based on the second prompt sequence.

4. The method according to claim 2, further comprising:

obtaining a compressed source semantic unit sequence and a compressed first semantic unit sequence by compressing the source semantic unit sequence and the first semantic unit sequence; and adjusting the first decoder by utilizing the compressed source semantic unit sequence, the compressed first semantic unit sequence, and the task information.

5. The method according to claim 4, further comprising:

obtaining a source timing value sequence and a first timing value sequence by compressing the source semantic unit sequence and the first semantic unit sequence, wherein the source timing value sequence and the first timing value sequence are associated with a pattern of the compression; and adjusting a third decoder of the plurality of decoders by utilizing the compressed source semantic unit sequence, the compressed first semantic unit sequence, the source timing value sequence, and the first timing value sequence.

6. The method according to claim 2, further comprising: adjusting the first decoder using multi-task learning, wherein the multi-task learning comprises at least one of the following:

a speech recognition task;

a text translation task; or a speech-to-speech conversion task.

7. The method according to claim 1, wherein the semantic feature extractor comprises any one of an unsupervised model and a cluster model.

8. The method according to claim 1, wherein at least one of the source language audio and the first language audio comprises an unwritten language, and the unwritten language has no handwritten text.

9. A method for speech translation, wherein the method is performed by the speech translation model generated according to claim 1, the speech translation model comprises a semantic feature extractor and a plurality of decoders, and the method comprises:

generating a predicted first semantic unit sequence based on a given source semantic unit sequence of given source language audio; and generating a predicted acoustic unit sequence based on the given source semantic unit sequence of the given source language audio, the predicted first semantic unit sequence, and a given source acoustic unit sequence.

10. The method according to claim 9, wherein generating the predicted first semantic unit sequence comprises:

obtaining a first predicted prompt sequence by combining the given source semantic unit sequence and task information; and generating the predicted first semantic unit sequence by inputting the first predicted prompt sequence into the first decoder of the plurality of decoders.

11. The method according to claim 10, wherein generating the predicted acoustic unit sequence comprises:

obtaining a second predicted prompt sequence by combining the given source semantic unit sequence, the predicted first semantic unit sequence, and the given source acoustic unit sequence; and generating the predicted acoustic unit sequence by inputting the second predicted prompt sequence into the second decoder of the plurality of decoders.

12. The method according to claim 9, further comprising:

generating predicted first language audio based on the predicted acoustic unit sequence.

13. An electronic device, comprising:

a processor; and a memory coupled with the processor, wherein the memory has instructions stored therein which, when executed by the processor, cause the electronic device to:

extract, by the semantic feature extractor, a source semantic unit sequence of source language audio and a first semantic unit sequence of first language audio, wherein the source language audio corresponds to the first language audio, wherein the source semantic unit sequence and the first semantic unit sequence are sequences of discrete digital units;

adjust a first decoder of the plurality of decoders based on the source semantic unit sequence and the first semantic unit sequence; and adjust a second decoder of the plurality of decoders based on the source semantic unit sequence, the first semantic unit sequence, a source acoustic unit sequence of the source language audio, and a first acoustic unit sequence of the first language audio, wherein the semantic feature extractor remains unchanged during the adjustment of the first decoder and the second decoder.

14. The electronic device according to claim 13, wherein the instructions causing electronic device to adjust the first decoder of the plurality of decoders further causes the electronic device to:

obtain a first prompt sequence by combining the source semantic unit sequence, the first semantic unit sequence, and task information, wherein the task information at least specifies a language type of the source language audio and a language type of the first language audio; and adjust the first decoder based on the first prompt sequence.

15. The electronic device according to claim 14, wherein the instructions causing electronic device to adjust the second decoder of the plurality of decoders further causes the electronic device to:

obtain a second prompt sequence by combining the source semantic unit sequence, the first semantic unit sequence, the source acoustic unit sequence, and the first acoustic unit sequence; and adjust the second decoder based on the second prompt sequence.

16. The electronic device according to claim 14, the instructions further cause the electronic device to:

obtain a compressed source semantic unit sequence and a compressed first semantic unit sequence by compressing the source semantic unit sequence and the first semantic unit sequence; and adjust the first decoder by utilizing the compressed source semantic unit sequence, the compressed first semantic unit sequence, and the task information.

17. The electronic device according to claim 16, the instructions further cause the electronic device to:

obtain a source timing value sequence and a first timing value sequence by compressing the source semantic unit sequence and the first semantic unit sequence, wherein the source timing value sequence and the first timing value sequence are associated with a pattern of the compression; and adjust a third decoder of the plurality of decoders by utilizing the compressed source semantic unit sequence, the compressed first semantic unit sequence, the source timing value sequence, and the first timing value sequence.

18. The electronic device according to claim 14, the instructions further cause the electronic device to adjust the first decoder using multi-task learning, wherein the multi-task learning comprises at least one of the following:

a speech recognition task;

a text translation task; or a speech-to-speech conversion task.

19. The electronic device according to claim 13, wherein the semantic feature extractor comprises any one of an unsupervised model and a cluster model.

20. A non-transitory computer-readable storage medium, having computer-executable instructions stored therein which, when executed by a processor, cause the processor to:

extract, by the semantic feature extractor, a source semantic unit sequence of source language audio and a first semantic unit sequence of first language audio, wherein the source language audio corresponds to the first language audio, wherein the source semantic unit sequence and the first semantic unit sequence are sequences of discrete digital units;

adjust a first decoder of the plurality of decoders based on the source semantic unit sequence and the first semantic unit sequence; and adjust a second decoder of the plurality of decoders based on the source semantic unit sequence, the first semantic unit sequence, a source acoustic unit sequence of the source language audio, and a first acoustic unit sequence of the first language audio, wherein the semantic feature extractor remains unchanged during the adjustment of the first decoder and the second decoder.

* * * * *